Aug. 25, 1953     E. W. DONATH ET AL     2,649,707
DEW-POINT MEASURING DEVICE
Filed June 22, 1951
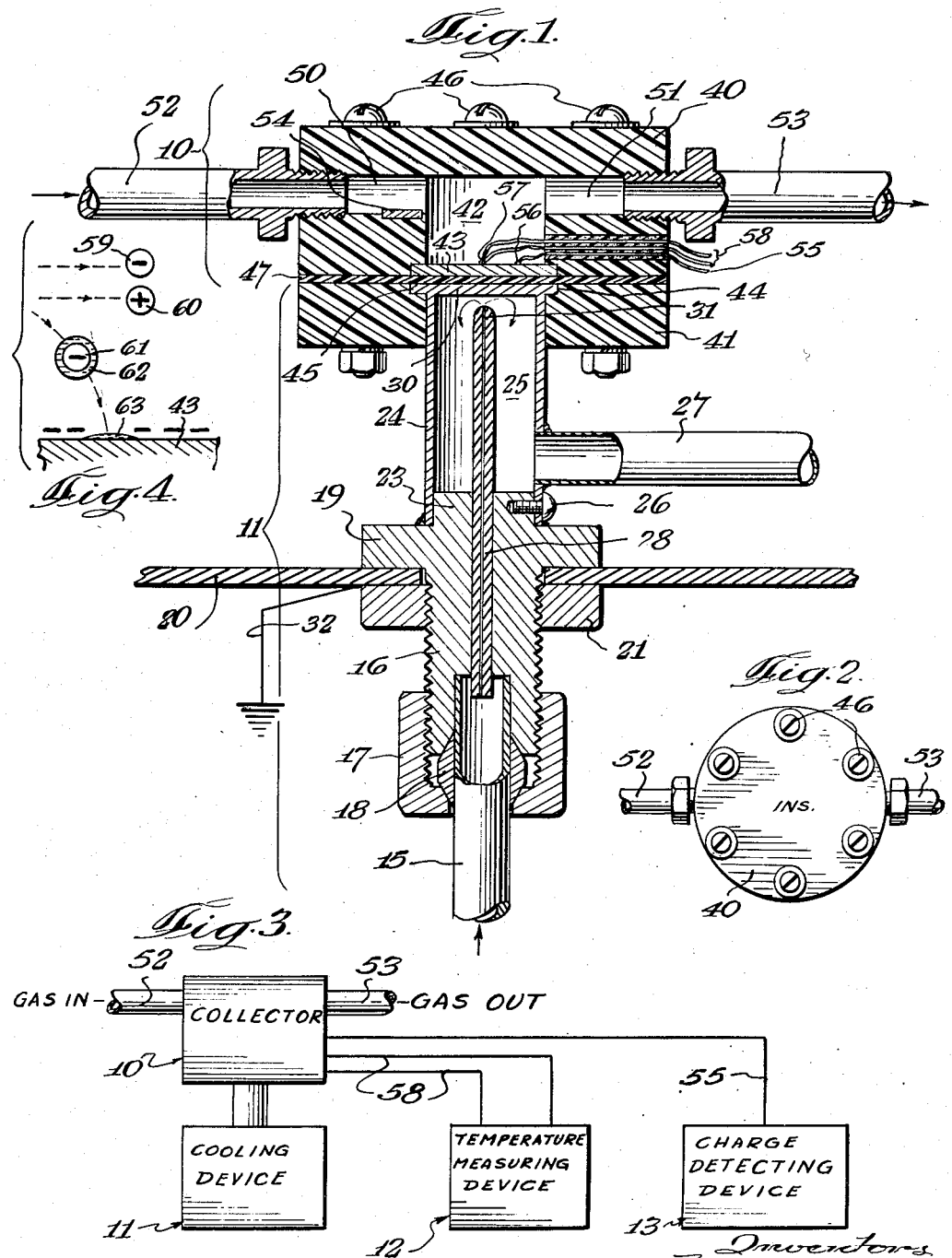
GAS IN — COLLECTOR — GAS OUT
COOLING DEVICE
TEMPERATURE MEASURING DEVICE
CHARGE DETECTING DEVICE
Inventors
Edwin W. Donath
Bruce A. Ritzenthaler
By I. Irving Silverman
Attorney

Patented Aug. 25, 1953

2,649,707

UNITED STATES PATENT OFFICE 2,649,707

DEW-POINT MEASURING DEVICE

Edwin W. Donath and Bruce A. Ritzenthaler, Chicago, Ill., assignors to Illinois Testing Laboratories, Inc., Chicago, Ill., a corporation of Illinois Application June 22, 1951, Serial No. 233,051

14 Claims. (Cl. 73—17)

This invention relates to dew-point meters and more particularly is concerned with a device for precisely and accurately measuring the dew-point of a gas by means independent of the observer's visual powers of perception of moisture condensate.

In many industries and as well in laboratories and the like it is of importance to determine the precise dew-point, either of a given gas sample or the atmosphere. This determination enables one readily to determine moisture content of the sample or the air. To the best of our knowledge, all methods heretofore devised have depended upon the observer seeing a deposit of dew upon a mirror, i. e., a highly polished metal surface; or in other cases, the method is based upon the creation of a visible vapor. The amount of vapor or dew required to be seen by the eye, even with optical instruments, is infinitely greater than the amount of moisture contained in the first few molecules of condensation that occur when the temperature of a gas sample is lowered past the dew-point. And yet, by the definition of the dew-point (the temperature at which the quantity of vapor present in the gas saturates the same, so that a lowering of the temperature an infinitesimal amount below that value will cause condensation to begin) the more accurately we can detect the instant that condensation begins, the more accurate will be our determination of the true dew-point.

The principal object of this invention is to provide a dew-point measuring device or instrument which will give accurate and reliable measurements of the dew-point by means independent of visual powers of the observer to detect a vapor or a film of dew.

Another object of the invention is to provide a dew-point meter, or detecting device, which will give an indication the moment a few molecules of condensation are produced, although said condensation may not be visible to the eye.

Another object of the invention is to provide a dew-point detecting device which will operate on principles entirely different from those of heretofore constructed dew-point meters.

In connection with the foregoing object, it is emphasized that dew-point meters heretofore produced operated on the principle of producing a vapor in a chamber or dew on a surface so that the observer detecting the presence thereof knew that the dew point had been reached and slightly exceeded. The accuracy of the device depended upon how quickly after the dew-point had been reached the detection could be made. Refinements of such instruments were in the optical system, the method of exhibiting the dew or vapor, and the like. Our new detection device operates upon an entirely different principle.

Our device operates upon the principle that the condensation first occurring is caused to occur upon charged particles which accumulate upon a mirror thereby changing the charge of the mirror detectably. The accuracy of measurement is then limited only by the physical limitations of the charge detecting instrument, and since such instruments are known which have extremely high sensitivity, the accuracy of such measurement is quite high. In practically all cases the dew-point indication is obtained long before any visible dew appears upon the mirror.

Therefore additional objects of the invention lie in the provision of a dew-point detecting device operating on this new principle and in the manner described.

It has been found that the condensation initially occurs on the negatively charged particles, and hence other objects of the invention are the provision of a device of the character described above in which there are means for providing negatively charged particles in the sample gas; means for collecting the condensation-carrying particles; and means for detecting the change in the charge of the collecting means caused by the deposit of the particles.

Many other objects lie in the provision of simple and effective apparatus for carrying out the above described objects and giving rise to the great advantages of the invention.

Other objects of the invention lie in the provision of a novel method of detecting the dew-point, which utilizes our principle.

With the foregoing and other objects in view which will appear as the description proceeds, the invention consists in certain novel features of construction hereinafter fully described and illustrated in the accompanying drawing, and in certain steps set forth, all as pointed out in the appended claims, it being understood that various changes in form, proportion, and minor details of the apparatus and method may be made without departing from the spirit or sacrificing any of the advantages of the invention.

For the purpose of facilitating an understanding of the method and apparatus of the invention, there is illustrated in the drawing a preferred embodiment of the apparatus of the dew-point measuring device, from an inspection of which, when considered in connection with the following description thereof and of the novel method, the invention and its advantages, and the advances made in the science and art to which same appertains readily should be appreciated and and understood.

Referring to the drawing in which the same characters of reference are employed to indicate corresponding or similar parts throughout the several figures:

Fig. 1 is a vertical sectional view taken through a dew-point measuring device constructed in accordance with our invention.

Fig. 2 is a top plan view of the same.

Fig. 3 is a block diagram of the apparatus of our invention used in practising our new method.

Fig. 4 is a schematic diagram illustrating the principle of operation of the invention.

The invention as mentioned is based upon a physical principle concerned with the tendency of moisture to collect upon charged particles. This principle has been experimentally proven by many, and notably by C. T. R. Wilson who published his results in Royal Society of London—Philosophical Transactions, volume CXCII-A (1900), page 289 and following. If the moisture of a gas is caused to collect selectively upon particles having a given charge then by separation of those charged particles from the gas sample and causing same to give some detectable indication, we can determine almost immediately when the dew point has been reached. The only limitation which will affect our determination of the precise instant that dew gathers upon the particles is the ability of the charge detecting instrument to respond to minute charges.

Specifically, as concluded by Wilson in the above article, moisture will initially adhere to negatively charged particles in preference to positively charged particles. By providing negatively charged particles in the gas sample, and lowering the temperature thereof little by little until the dew-point is reached, we can cause the moisture to condense upon the negative particles. These "wet" particles are then collected upon a conducting mirror which has been carefully insulated. The mirror thereby acquires a negative charge which can be measured. When the mirror acquires this charge it means that the dew-point has been reached, and the temperature of the mirror and the gas at that instant is a direct reading of the dew-point.

Referring now to the drawing, the dew-point measuring device consists of a number of parts shown in the block diagram of Fig. 3. These are designated generally 10, 11, 12, and 13, and consist respectively of the collector, the cooling device, the temperature measuring device, and the charge detecting device. All of these with the exception of the collector are well known in the art. For example, the cooling device could be a refrigerating expansion valve, a brine solution, a coil carrying coolant, etc. The temperature measuring device could be an accurate direct reading thermometer, a differential thermometer, a thermocouple and galvanometer, a temperature bridge, etc. The charge detecting instrument could be an electronic or foil electrometer or the like.

The heart of the device which is illustrated has been termed the collector for lack of a better designation, principally because the charged particles carrying the condensate are collected therein.

In Figs. 1 and 2, we have shown a practical construction the upper part of which is the collector 10, and the lower part of which is the cooling device 11. In this case the cooling device is a simple expansion valve or jet which expands carbon dioxide or other refrigerative gas to lower the temperature of the mirror. The inlet tube 15 of relatively large diameter brings the gas from a tank or other source to the fitting 16. The tube 15 is secured to the fitting 16 by a compression coupling of any suitable construction, comprising for example the gland 17 screwed onto the fitting and having the malleable member 18 to secure the joint. The fitting 16 has an upper flange 19 which overlies the mounting bracket 20 to which the entire assembly is secured. The bracket 20 may be a part of the instrument chassis or any other suitable standard mounting the device. It could be a case housing the instruments 12 and 13 for example.

A nut 21 clamps the fitting 16 to the bracket 20. The fitting 16 has a projection 23 which fits into a cylindrical metal member 24 forming an expansion chamber 25. The cylindrical member 24 is fixed by a set screw 26. A conduit 27 comprising an outlet for the expanded refrigerant is brazed or welded to the side of the cylinder 24. A fine tube 28 passes from the end of the inlet tube 15 through the nut 16 up to the top of the chamber 25 where its efflux will impinge against the target which comprises the cap 30 of the cylinder 24. Obviously the upper end 31 of the tube 29 comprises a refrigerating expansion valve or jet because the refrigerant is compressed upon entering the bottom of the tube 28 and suddenly expanded upon leaving the upper end 31 causing the gas to lose heat according to well-known principles.

We have conveniently used a capillary tube for the tube 28.

Thus far we have described the cooling device 11 which, as has been stated, is described only by way of illustration, since any similar cooling device is suitable. The cylinder 24 and the cap 30 are made of any good conductive material such as silver or copper, and are well grounded as indicated at 32. This is to prevent false readings which might be caused by any ionization occurring in the chamber 25 at the jet 31.

The collector 10 is firmly secured to the top of the cylinder 24 in any suitable manner. However, since the cap 30 is the source of cooling for the collector, this portion of the cooling device should be adjacent the mirror. Thus, the collector 10 consists of a cylindrical casing 40 clamped to the top of the cylinder 24 by means of an annular plate 41. The casing 40 is imperforate on its upper or outside face and has a central sample chamber 42, the bottom of which is closed off by a mirror 43, i. e., a metal plate of good conductivity upon which it is intended that the moisture laden particles will collect. The mirror 43 closes off the sample chamber 42 and is flush with the bottom of the casing 40. The cap 30 is flanged as at 44 and rests in a suitable shoulder 45 provided in the plate 41 so that it is flush with the upper surface of the plate. The casing and annular plate 41 are clamped together by a plurality of bolts 46 passing completely through the same and held in place by the usual nuts and lock washers. There is a thin sheet or diaphragm 47 separating the two parts, i. e. the casing and flange, which sheet extends completely across the assembly and thereby is sandwiched between the cap 30 and the mirror 43, thereby spacing same apart.

Since the principle of operation depends upon the detecting of minute charges, it is essential that every precaution be used to insulate the mirror 43 from all other parts of the device. The entire collector is therefore formed of an electrically insulating material except for the bolts 46 and other parts to be described. Thus, the casing 40, the plate 41 and the diaphragm or sheet 47 are all formed of highly insulating material. It is desirable that the material while serving as a good electrical insulator, be a good thermal conductor between the target and mirror. In other words, it is best that the cooling effect produced in the chamber 25 be felt as quickly as possible in the chamber 42. This is an advantageous arrangement because it decreases the total time required for making a measurement. There are at present no commercially available substances that we know of which, while highly insulating from the electrical standpoint, are poor heat and cold insulators, and it would be advantageous to have such material. In lieu thereof, we make the diaphgram 47 as thin as practically possible to form a short thermal path, and we establish a high temperature gradient between the target and mirror.

The chamber 42 has an inlet port 50 on the left in Fig. 1 and an outlet port 51 on the right. These ports have inlet and outlet conduits 52 and 53 respectively connected thereto, and it is intended that the sample gas be conducted through the port 50 and released through the port 51. In the throat of the port 50 we have fixed an ionizing device 54. This may take any suitable form, such as for example a natural or artificial radiation producing substance which will affect the gas sample. We have used with success a metal foil having a radium salt deposited thereon and coated with a thin metallic plating to preserve the same. The ionizing device 54 may be inserted in a depression of or cemented to the throat.

The measurements required to be made are the qualitative measurement of charge and the quantitative measurement of temperature. We state that the charge measurement is qualitative because it is immaterial as to the value of the charge measured. So long as there is a charge which is detectable by available instruments, there must be a deposit of condensate carrying particles collected upon the mirror 43. To make these measurements, we have brazed or welded an electrical conductor 55 to the mirror 43 at 56 and led the conductor through the side wall of the casing 40, and we have also welded or brazed a thermocouple at 57 to the mirror 43 and led its connecting conductors 58 also through the side wall of the casing 40. As will be seen in Fig. 3, the conductors 58 connect with a temperature measuring device 12, while the conductor 55 connects to a charge measuring device 13. Technically, the thermocouple 57 is a part of the temperature measuring device, but it should be appreciated that the block diagram is schematic and is intended only for assistance in understanding the invention.

The method of determining the dew-point will now be described. First the gas sample is caused slowly to enter the chamber 42. As it enters the chamber it must pass through the throat of the port 50 where it is subjected to the influence of the ionizing device. Radiation from the device 54 bombards the gas molecules and will ionize a great percentage thereof. The resulting particles are of at least two types, depending upon their charge. There are positive particles and negative ions. These are shown diagrammatically in Fig. 4. The path of the moving gas and particles is to the right in said figure. Note that we have shown positive particle 60 and negative particle 59 both of which move generally along the indicated paths and not affecting the mirror 43 while the temperature thereof is above the dew-point. As the mirror and the gas particles decrease in temperature, the dew-point will be reached. The positive particles 60 will be unaffected at first, but at this point, the moisture in the gas will condense upon the negative particles as shown diagrammatically by the particle 61 acquiring a condensate coating 62. The now heavy particle 61 will gravitate to the surface of the mirror 43 along the general path indicated and the moisture will collect on the surface as indicated at 63. The particle 61 will charge the mirror negatively. This will continue until the total negative charge of the mirror 43 is sufficient to drive the charge detecting device 13. The device which may be a moving vane electrometer is affected by the charge through the conductor 55, and when we observe movement of the vane (or through any other indication depending on the nature of the instrument) we immediately read the temperature. This gives the dew-point of the gas sample from which it is relatively easy to determine the desired data respecting the gas. Eventually, moisture will condense upon positive particles also, but long after the dew-point has been reached.

The method of the invention need not be practised with the apparatus described, but can be applied to many different constructions. It may consist generally of the following steps: a gas sample is treated to form charged particles having an affinity for moisture, the treated gas is passed over an isolated collecting surface, the surface is cooled until a charge is detected thereon, and the temperature of the surface is measured at the instant the charge is detected.

It is believed that the above explanation should suffice completely and fully to explain our method of determining dew-point and a preferred embodiment of apparatus for practising the invention to enable the use thereof by one skilled in the art to which this subject matter pertains. Obviously the method and the apparatus are both capable of great variation from the specific details set forth, but all without departing from the spirit and purview of the invention and without leaving the scope thereof as defined by the appended claims.

We claim:

1. A dew-point detecting instrument which comprises an electrically insulated metal surface, means for leading a gas to impinge on said surface, means for introducing negatively charged particles to said gas, means for cooling the surface whereby the gas in the vicinity of said surface is cooled to cause condensation of moisture upon said particles, means for detecting the charge on said surface caused by collection on said surface of said particles having condensate thereupon, and means for measuring the temperature of said surface.

2. A dew-point detecting instrument which comprises a collecting chamber having inlet and outlet for a sample gas, electrical charge accumulating means electrically isolated and arranged to have said gas pass over the same, means for introducing charged particles into said gas as it passes into said chamber, said particles including a type having the same polarity and an affinity for condensate deposition thereon, means for cooling the gas in the vicinity of the charge accumulating means, means for indicating the presence of a charge on said accumulating means, and a temperature measuring device for determining the temperature of said accumulating means.

3. A dew-point detecting instrument which comprises a chamber having gas inlet and outlet means, an electrically insulated metal surface in the chamber, means for cooling the surface whereby to cool the gas in the chamber in the vicinity of said surface, an ionizing medium in the inlet means for ionizing at least part of said gas, means for detecting the charge of the said surface and means for measuring the temperature of said surface.

4. An instrument as defined in claim 3 in which the ionizing medium comprises a radioactive substance.

5. An instrument as defined in claim 3 in which the temperature measuring means includes a thermocouple bonded to said surface.

6. In a dew-point detecting instrument, a casing formed of electrical insulating material and having a chamber therein, a dew-collecting mirror on the bottom of the chamber, there being gas inlet and outlet ports in said casing for leading gas into and out of said chamber, means for ionizing at least a part of said gas entering the chamber to accumulate a detectable charge on the mirror, means for detecting the said charge, and means cooling the mirror and means responsive to the temperature of said mirror.

7. In a dew-point detecting instrument, a casing formed of electrical insulating material and having a chamber therein, a dew-collecting mirror on the bottom of the chamber, there being gas inlet and outlet ports in said casing for leading gas into and out of said chamber, means for ionizing at least a part of said gas entering the chamber to accumulate a detectable charge on the mirror, means for detecting the said charge, and means cooling the mirror, including a cooling chamber secured to said casing opposite said mirror and having a thin diaphragm of electrically insulating material between the cooling chamber and said mirror and means responsive to the temperature of said mirror.

8. In a dew-point detecting instrument, a casing formed of electrical insulating material and having a chamber therein, a dew-collecting mirror on the bottom of the chamber, there being gas inlet and outlet ports in said casing for leading gas into and out of said chamber, means for ionizing at least a part of said gas entering the chamber to accumulate a detectable charge on the mirror, plus means including an electrical conductor connected with said mirror and extending through the casing, a charge detecting instrument connected to said conductor and means responsive to the temperature of said mirror.

9. In a dew-point detecting instrument, a casing formed of electrical insulating material and having a chamber therein, a dew-collecting mirror on the bottom of the chamber, there being gas inlet and outlet ports in said casing for leading gas into and out of said chamber, means for ionizing at least a part of said gas entering the chamber to accumulate a detectable charge on the mirror, means including an electrical conductor connected with said mirror and extending through the casing, a charge detecting instrument connected to said conductor, and means including a temperature sensitive element mounted in said chamber for measuring the temperature thereat.

10. In a dew-point detecting instrument, a casing formed of electrical insulating material and having a chamber therein, a dew-collecting mirror on the bottom of the chamber, there being gas inlet and outlet ports in said casing for leading gas into and out of said chamber, means for ionizing at least a part of said gas entering the chamber to accumulate a detectable charge on the mirror, means including an electrical conductor connected with said mirror and extending through the casing, a charge detecting instrument connected to said conductor, and a thermocouple in the chamber and having leads extending through the casing for connecting the thermocouple with a current detecting device.

11. In a dew-point detecting device, a metal target, means for directing a coolant against the target, a housing having the target mounted in the bottom thereof, a gas chamber in the housing having inlet and outlet means, a collecting mirror disposed in the bottom of said chamber in close proximity to said target and electrically insulated therefrom and means in the housing for producing negatively charged particles in a gas passing through the chamber whereby moisture will condense on said particles causing same to impinge against said mirror thereby charging the same, means for detecting the charge on said mirror, and means responsive to the temperature of said mirror.

12. The combination described in claim 11 in which the entire housing is formed of an electrically insulating material and the mirror and target are separated from one another by a thin diaphragm of the electrically insulating material.

13. The combination described in claim 11 in which the last mentioned means comprises a radio-active substance disposed in the inlet means and serving at least partially to ionize gas entering therethrough.

14. The combination described in claim 11 in which the target is grounded.

EDWIN W. DONATH.
BRUCE A. RITZENTHALER.

References Cited in the file of this patent

UNITED STATES PATENTS

| Number | Name | Date |
| --- | --- | --- |
| 1,883,116 | Tomlinson | Oct. 18, 1932 |
| 2,542,944 | Rieber | Feb. 20, 1951 |

OTHER REFERENCES

Paper by C. T. R. Wilson, "Efficiency as Condensation Nuclei of Positively and Negatively Charged Ions published in Royal Society of London-Philosophical Transactions," vol. 193 A, 1900, pages 289–303.

Article: "An Electrical Method of Measuring Water Vapor Pressure in a Sealed Off Discharge Tube," B. N. Clack, published Journal of Scientific Instruments and Physics, vol. 26, Feb. 1949 (pgs. 58–59).

General Electric Co.: General News Bureau Bulletin, dated Nov. 10, 1949, re: device of Dr. Bernard Vonnegut (G. E. Co.).

Book: Cloud Physics by Perrie (John Wiley & Sons, Inc.), 1950, page 37.